J. LEE.

Assignor to the HALE & KILBURN MANUFACTURING COMPANY, of Philadelphia, Pa.

Convertible Chair.

No. 7,970. Reissued Nov. 27, 1877.

*Witnesses.*
A. Ruppert.
J. S. Mason.

James Lee
*Inventor.*
D. P. Holloway & Co.
Attys

N. PETERS, PHOTO-LITHOGRAPHER, WASHINGTON, D. C.

UNITED STATES PATENT OFFICE.

JAMES LEE, OF NEW YORK, N. Y., ASSIGNOR TO THE HALE & KILBURN MANUFACTURING COMPANY, OF PHILADELPHIA, PENNSYLVANIA.

IMPROVEMENT IN CONVERTIBLE CHAIRS.

Specification forming part of Letters Patent No. 91,350, dated June 15, 1869; Reissue No. 7,970, dated November 27, 1877; application filed May 18, 1877.

*To all whom it may concern:*

Be it known that I, JAMES LEE, of New York, in the county of New York and State of New York, have invented a new and Improved Combined Child's Chair and Carriage; and I do hereby declare that the following is a full, clear, and exact description thereof, which will enable others skilled in the art to make and use the same, reference being had to the accompanying drawing, forming part of this specification, in which—

Figure 1:
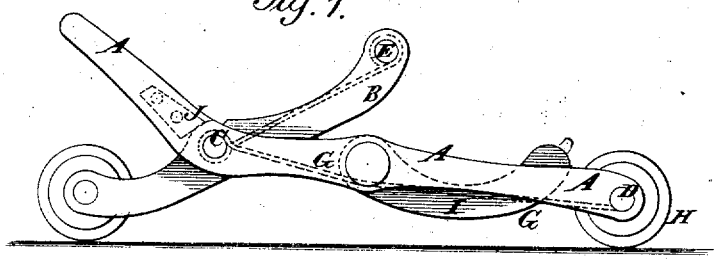
Figure 2:
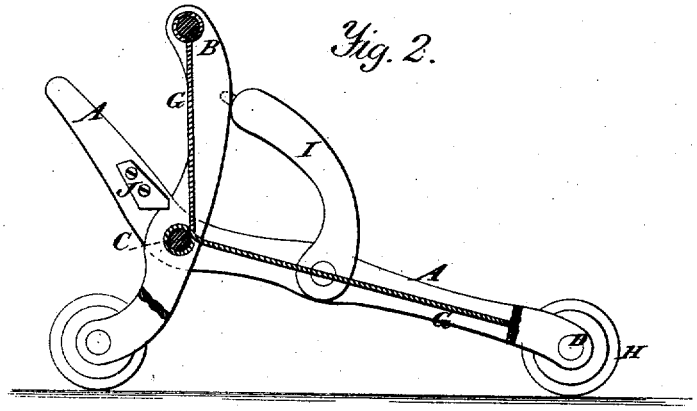
Figure 3:
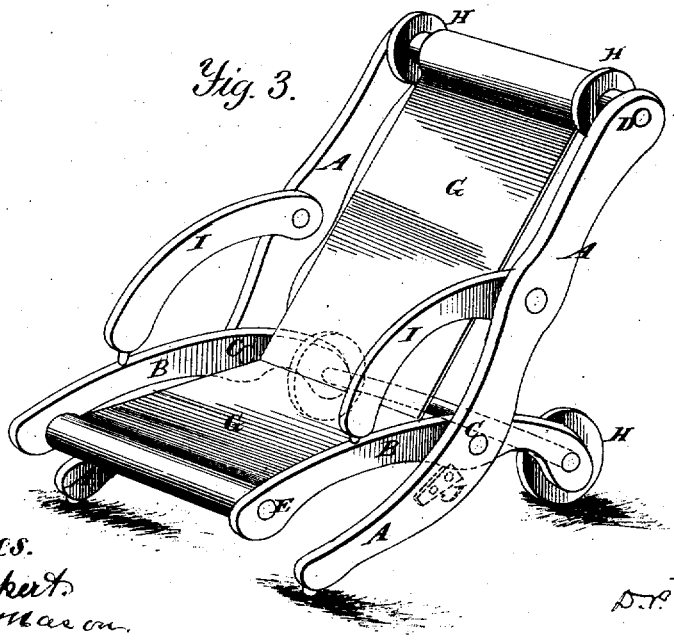

Figure 1 is a side view of my improved chair and carriage, showing an arrangement for use as a wagon. Fig. 2 is a side view of the same arranged for use as a wagon or wheelbarrow, part being broken away to show the construction. Fig. 3 is a perspective view of the same arranged for use as a chair.

Similar letters of reference indicate corresponding parts.

This invention has for its object a child's convertible chair and carriage affording supports for the child of different heights, and shiftable, so that in different positions it may stand on legs or rest on wheels, on which it may be trundled as a carriage or barrow; and to this end it consists in attaching the part on which it is intended the child shall rest to arms pivoted together in such manner as to permit the base to be expanded or contracted, and thus the position of the occupant to be raised or lowered, such position being determined by stops, which control the angle of inclination of the legs.

It consists in the construction and combination of the various parts, as hereinafter more fully described.

A are bars, the upper parts of which form the side rails of the chair-back, and the lower parts of which form the fore legs of the chair, or the handle for propelling it, according as the machine is to be used as a chair or wagon.

B are bars, the upper parts of which form the side bars of the chair-seat, the lower parts of which form the rear legs of the chair.

C is a round or cross-bar, which passes through the bars A and B at their points of intersection, and thus pivots the said bars to each other. The upper ends of the bars A, the upper ends of the bars B, and the lower ends of the said bars B are also connected by the rounds or cross-bars D E F, respectively, as shown in Figs. 3.

The lower ends of the bars A may also be connected by a round or cross-bar, if desired.

G is the back and seat of the chair, which I prefer to make of cloth, and which passes around and is secured to the three rounds E C D, as shown in Figs. 1, 2, and 3.

H are wheels, which work upon journals formed upon the rounds or cross-bars D and F, and upon which the chair is supported when adjusted as a wagon or barrow, as shown in Figs. 1 and 2.

I are arms, one end of each of which is pivoted to the side bars A, and their other ends are provided with tenons or pins, which enter sockets or holes in the bars B, as shown in Figs. 2 and 3.

When the chair is adjusted for use as a chair the arms I serve as chair-arms simply; but when the chair is adjusted for use as a wagon the arms I serve as braces, to support the upper parts of the bars B and hold them in place, as shown in Fig. 2.

In the adjustment shown in Fig. 1 the arms I are not used, and may be turned down out of the way, as shown.

When the chair is adjusted in the manner shown in Fig 2—by raising the rear part by means of the handles, so that the forward wheels alone may rest upon the floor—the said chair is converted into a wheelbarrow.

J are blocks attached to the bars A, to serve as stops and supports when the chair is adjusted into the forms shown in Figs. 1 and 3, while the braces I serve as stops to hold the parts in the position shown in Fig. 2.

Having thus described my invention, I claim as new and desire to secure by Letters Patent—

The combination, in a convertible chair and carriage, of the crossed bars A and B, pivoted together at C, wheels H H, mounted on the respective bars, and stops for supporting the bars at varying angles of inclination, substantially as set forth.

In testimony that I claim the foregoing I have hereunto set my hand this 11th day of April 1877.

JAMES LEE.

Witnesses:
K. NEWELL,
JAMES H. HUNTER.